US012595347B2

(12) United States Patent
Shinko et al.

(10) Patent No.: US 12,595,347 B2
(45) Date of Patent: Apr. 7, 2026

(54) HYDROFLUORO OLEFIN PROPELLANT IN A POLYURETHANE FOAM COMPOSITION

(71) Applicant: ICP CONSTRUCTION, INC., Andover, MA (US)

(72) Inventors: Andrew P. Shinko, Uniontown, OH (US); Anthony J. Taylor, Medina, OH (US)

(73) Assignee: ICP CONSTRUCTION, INC., Andover, MA (US)

(*) Notice: Subject to any disclaimer, the term of this patent is extended or adjusted under 35 U.S.C. 154(b) by 0 days.

(21) Appl. No.: 19/058,590

(22) Filed: Feb. 20, 2025

(65) Prior Publication Data

US 2025/0197581 A1 Jun. 19, 2025

Related U.S. Application Data

(63) Continuation of application No. 17/471,660, filed on Sep. 10, 2021, now Pat. No. 12,258,459, which is a continuation of application No. 16/125,052, filed on Sep. 7, 2018, now abandoned.

(60) Provisional application No. 62/555,677, filed on Sep. 8, 2017.

(51) Int. Cl.

| | |
|---|---|
| ***C08J 9/14*** | (2006.01) |
| ***C08G 18/16*** | (2006.01) |
| ***C08G 18/18*** | (2006.01) |
| ***C08G 18/22*** | (2006.01) |
| ***C08G 18/24*** | (2006.01) |
| ***C08G 18/32*** | (2006.01) |
| ***C08G 18/40*** | (2006.01) |
| ***C08G 18/42*** | (2006.01) |
| ***C08G 18/48*** | (2006.01) |
| ***C08J 9/228*** | (2006.01) |
| ***C08K 3/08*** | (2006.01) |
| ***C08K 5/053*** | (2006.01) |
| ***C08L 75/04*** | (2006.01) |

(52) U.S. Cl.

CPC ............ *C08J 9/143* (2013.01); *C08G 18/163* (2013.01); *C08G 18/1816* (2013.01); *C08G 18/225* (2013.01); *C08G 18/246* (2013.01); *C08G 18/3206* (2013.01); *C08G 18/4018* (2013.01); *C08G 18/4213* (2013.01); *C08G 18/4812* (2013.01); *C08G 18/4825* (2013.01); *C08G 18/4829* (2013.01); *C08J 9/146* (2013.01); *C08J 9/228* (2013.01); *C08K 3/08* (2013.01); *C08K 5/053* (2013.01); *C08L 75/04* (2013.01); *C08G 18/18* (2013.01); *C08G 2110/005* (2021.01); *C08G 2110/0058* (2021.01); *C08J 2203/162* (2013.01); *C08J 2207/04* (2013.01); *C08J 2475/06* (2013.01); *C08J 2475/08* (2013.01); *C08K 2003/0825* (2013.01); *C08L 2203/14* (2013.01); *C08L 2205/03* (2013.01)

(58) Field of Classification Search

CPC .. C08G 18/163; C08G 18/18; C08G 18/1816; C08G 18/225; C08G 18/246; C08G 18/3206; C08G 18/4018; C08G 18/4213; C08G 18/4812; C08G 18/4825; C08G 18/4829; C08G 2110/005; C08G 2110/0058; C08J 9/143; C08J 9/146; C08J 9/228; C08J 2203/162; C08J 2207/04; C08J 2375/06; C08J 2375/08; C08J 2475/06; C08J 2475/08; C08K 3/08; C08K 5/053; C08K 2003/0825; C08L 75/04; C08L 2203/14; C08L 2205/03

See application file for complete search history.

(56) References Cited

U.S. PATENT DOCUMENTS

| | | | | |
|---|---|---|---|---|
| 2016/0009847 A1* | 1/2016 | Van Der Puy | C08G 18/3206 | 521/110 |
| 2016/0145374 A1* | 5/2016 | Ishikawa | C08G 18/14 | 521/129 |
| 2016/0200890 A1* | 7/2016 | Taylor | C08G 18/225 | 521/125 |

* cited by examiner

*Primary Examiner* — John M Cooney

(74) *Attorney, Agent, or Firm* — Fredrikson & Byron, P.A.

(57) ABSTRACT

A process and composition is described for the inclusion of polyether polyols in concentrations greater than 10% loading on the B-side formulation with a catalyst package less than 1% loading on the B-side formulation. In one specific example, the use of glycerin as a fluorine ion scavenger is utilized to improve performance of the polyurethane systems through a twelve-month shelf life.

14 Claims, No Drawings

HYDROFLUORO OLEFIN PROPELLANT IN A POLYURETHANE FOAM COMPOSITION

CROSS-REFERENCE TO RELATED APPLICATIONS

This application is a continuation of U.S. patent application Ser. No. 17/471,660 filed Sep. 10, 2021, which is a continuation of U.S. patent application Ser. No. 16/125,052, filed Sep. 7, 2018, now abandoned, which claims priority to U.S. Provisional Patent Application No. 62/555,677 filed Sep. 8, 2017 the entire contents of each of which are hereby incorporated by reference.

TECHNICAL FIELD

The invention described herein pertains generally to a polyurethane foam composition which is blown using at least one hydrofluoro olefin ("HFO") propellant.

BACKGROUND OF THE INVENTION

Two-component low pressure (less than 250 psi) spray polyurethane foam (SPF) kits require a sufficient amount of blowing agent in order to fully dispense the contents of both the A-side (isocyanate) and B-side (polyols, surfactants, catalysts, etc.) chemicals. This must be done in such a manner where both A and B components are propelled at a predetermined ratio that is maintained throughout the dispensing of the product. On the other hand, one component low pressure polyurethane foam (OCF) systems are already pre-mixed in closed systems where the A/B ratio is predefined. OCF systems are typically blown with hydrocarbons, but flammability concerns restrict their usage in certain cylinders. Since most SPF kits are dispensed in pressurized cylinders, less flammable blowing agents must be considered. The blowing agent(s) used must be at least partially miscible with both A-sides and B-sides and should not react with either contents.

Previous blowing agents for SPF systems have included chlorofluorocarbons (CFCs) and hydrochlorofluorocarbons (HCFCs). These blowing agents, while reliable, are a threat to the stability of the ozone layer due to their ability to release chlorine atoms under ultraviolet light exposure. Free chlorine atoms readily react with ozone; therefore, compounds such as CFCs and HCFCs are said to have high ozone depletion potential (ODP). The Montreal Protocol was established in part to reduce emissions deemed responsible for the growth in the ozone layer hole. This agreement and subsequent additions were ratified by the maximum number of UN signatories. Due to this widespread acceptance, CFC and HCFC propellants were phased out and replaced by hydrofluorocarbon (HFC) blowing agents in the late 1990's and early 2000's.

HFC-134a became the non-flammable blowing agent of choice for the low pressure SPF industry due to relative ease of transition among other factors. While HFC-134a and other HFC blowing agents have an ODP value of zero, these compounds have a high global warming potential (GWP). Unlike ODP, GWP is measured by atmospheric residence time and infrared radiation absorption relative to the Earth's atmosphere. These factors determine the radiative forcing of the molecule. A positive radiative forcing value indicates a higher potential for warming the planet; that is, more solar radiation is absorbed than reflected out to space. The radiative forcing of a particular molecule is compared against the radiative forcing of carbon dioxide. The resulting number is the GWP of the particular molecule, with carbon dioxide given a GWP of 1. Radiative forcing is not a linear quantity, however, and is dependent on external factors such as climate sensitivity and molecule-specific pulse emissions over a particular time period, denoted as time horizons measured in 20, 100, and 500 years. For instance, the global warming potential of 134a decreases with an increasing time horizon, but the global warming potential of many perfluorocarbons increases with an increasing time horizon. Because of this discrepancy, most GWP values are typically reported at a time horizon of 100 years. In addition, GWP values have changed over time as improved modeling and empirical data becomes readily available. To this end, the GWP of HFC-134a reported by the Intergovernmental Panel on Climate Change has changed from: 1300 in 2001; to 1430 in 2007; to 1550 in 2013.

While the abundance of HFCs in the Earth's atmosphere is much less than that of carbon dioxide, HFC emissions are projected to grow between 7-19% to that of carbon dioxide emissions by 2050. This may result in the total radiative forcing of HFCs increasing by a factor of 10 to 30 times by 2050. In light of this and other data, the Kyoto Protocol was established in order to reduce greenhouse gas emissions, which included HFCs. This new agreement has gained traction, especially in the United States. A Significant New Alternative Policy (SNAP) ruling by the EPA has established effective end dates for producing foaming products with HFC blowing agents. The current proposed date for unacceptable HFC usage is Jan. 1, 2020 for rigid polyurethane one-component foams and Jan. 1, 2021 for rigid polyurethane low pressure two-component foams.

Potential low GWP replacements for HFC blowing agents include hydrofluorooelfin (HFO) blowing agents. Specifically, the Solstice® Gas Blowing agent (GBA, HFO-1234ze, trans 1,3,3,3 tetrafluoropropene) produced by Honeywell has been proposed as a blowing agent for low pressure SPF systems. Attractive properties of HFO-1234ze include a low boiling point (−19° C.) and favorable kauri-butanol solubility (25 compared to 9.2 for HFC-134a). In addition, HFO-1234ze has an ODP of zero, is volatile organic carbon (VOC) exempt, and has a GWP of less than 1 due in part to its low atmospheric lifetime (~18 days) compared with HFC-134a (13.4 years).

Although HFO blowing agents like HFO-1234ze meet requirements for the Kyoto Protocol (GWP<150) and are cleared for use under SNAP 21, the short lifespan of the molecule has led to challenges with the product shelf life of closed SPF systems. Stated earlier, SPF systems contain A-side (isocyanate) and B-side (resin) components stored separately under pressure. Both sides require propellants to fully dispense these mixtures. HFO-1234ze and other HFO blowing agents will break down on the B-side. HFO molecules are believed to react with amine catalysts, for example, via nucleophilic substitution. This reaction produces hydrofluoric acid, which in turn attack surfactants and polyols. Such phenomena has been observed via nuclear magnetic resonance (NMR) and gas chromatography-mass spectrometry. These undesirable reactions produce a significant reduction in foam properties, particularly gel and tack-free times, foam appearance, cell structure, and mechanical properties among others. Consequently, a simple 1:1 substitution of an HFC blowing agent with an HFO blowing agent in a polyurethane SPF system can reduce shelf life from one year or greater to a matter of weeks. Therefore, systems that were stable in HFCs will need to undergo modifications in order to meet the demand of shelf life stability and superior foam properties. Any formulated HFO adhesive must emulate the spray characteristics and general physical properties of the current HFC-blown two-component products currently on the market and must have adequate or better adhesive properties. The product must be shelf-life stable for at least 12 months. HFO-1234ze was selected as the blowing agent of choice for this study.

This invention was developed to overcome some of the limitations of the teachings of the prior art as well as to address long term stability issues when using HFO propellants in blowing polyurethane foams. The prior art appears to teach that aromatic polyester polyols are preferred in the "B" side of a two-component polyurethane foam and that there should be no more than approximately 10% aliphatic polyether polyol. This composition appeared to be counterintuitive as one having ordinary skill in the art might expect that polyester polyols would be problematic because polyester polyols are greater nucleophiles and therefore, more susceptible to attack.

The present invention overcomes some of the limitations taught in the prior art by teaching that higher loading of polyether polyols is possible in HFO blown two-component polyurethane foams, this improvement being achieved by the use of a milder catalyst package in combination with the inclusion of glycerol, a low molecular weight triol.

SUMMARY OF THE INVENTION

It is an aspect of the present invention to provide a two component low pressure polyurethane foam comprising: an A-side comprising: at least one diisocyanate, and an HFO propellant; and a B-side comprising: approximately 30-50% by weight of at least one polyester polyol; approximately 10-40% by weight of at least one polyether polyol; approximately 1-15% by weight of a triol or a polyol (including diols) having a functionality ≥2 and having a molecular weight between approximately 90-1,500 inclusive; approximately 0.3-1% by weight of an amine catalyst; approximately 0.3-1% by weight of a potassium-based catalyst; and an HFO propellant. In one specific exemplary composition, the triol is glycerin.

It is another aspect of the present invention to provide a process to extend the shelf-life of a low-pressure two-component polyurethane spray foam comprising the step of: adding approximately 1-15% by weight of a triol or a polyol (including diols) having a functionality ≥2 and having a molecular weight between approximately 90-1,500 inclusive to a B-side, the B-side further comprising: approximately 30-50% by weight of at least one polyester polyol; approximately 10-40% by weight of at least one polyether polyol; approximately 0.3-1% by weight of an amine catalyst; approximately 0.3-1% by weight of a potassium-based catalyst; and an HFO propellant; the A-side further comprising: at least one diisocyanate; and an HFO propellant. In one specific exemplary composition, the triol is glycerin.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE INVENTION

The best mode for carrying out the invention will now be described for the purposes of illustrating the best mode known to the applicant at the time of the filing of this invention. The examples and figures are illustrative only and not meant to limit the invention, as measured by the scope and spirit of the claims.

Unless the context clearly indicates otherwise: the word "and" indicates the conjunctive; the word "or" indicates the disjunctive; when the article is phrased in the disjunctive, followed by the words "or both" or "combinations thereof" both the conjunctive and disjunctive are intended.

As used in this application, the term "approximately" is within 10% of the stated value, except where noted.

The literature would appear to teach that to achieve shelf life stability for an HFO propellant-based two-component polyurethane composition, there should preferably be at least one aromatic polyester polyol (in a major amount) and no more than approximately 10% aliphatic polyether polyol. The literature appears to highlight the benefits of polyester polyols, and more specifically aromatic polyester polyols, over those of aliphatic polyether polyols. This composition was believed to be counterintuitive, as one skilled in the art might expect the polyester polyols to be problematic due to the polyester polyols being greater nucleophiles and, therefore, more susceptible to attack. The prior art would appear to be teaching that polyether polyols seem to be significantly detrimental to the shelf life of the foam product.

In this application, a shelf-life stable formula blown with a gaseous hydrofluoroolefin (HFO) was selected in the following study to show differences between polyether and polyester polyol loadings. The polyester-containing formula observes minimal drift in physical properties while the polyether-containing formula failed over a 6-month accelerated aging process (kit stored at 50° C. for 24 days per the Arrhenius relationship correlates to 6 months real-time aging). Hydroxyl numbers were kept constant for both formulations. Catalysts, surfactants, plasticizers, and relative concentrations thereof were also kept constant.

Experimental

Pairs of 12-oz. aluminum cans, 7.5-inch, or 12-inch steel cylinders were filled with appropriate amounts of isocyanate or resin, HFO-1234ze, and nitrogen in order to have a consistent A/B ratio as the kit emptied. The A-side and B-side components were sprayed onto a cardboard substrate from pressurized cylinders or cans using a gun or wand dispensing unit, respectively, with a replaceable static mixing nozzle head. Kits were sprayed out at room temperature conditions (23° C.±2° C.) and were conditioned (stored) at room temperature conditions prior to spray-out unless stated otherwise. The resultant foam was used for the testing of physical properties. Gel and tack-free times were recorded along with the measured A/B ratio, determined by the weights of each cylinder or can before and after the spray-out. Gel time is defined as the time in which the strength of the foamed product is greater than that of the adhesive strength of the curing foam to a particular probe, such as a toothpick, spatula, etc. In other words, a gel time is reached when a probe can be inserted into the product and removed cleanly without any material adhered to the probe. This is facilitated by an increase of the crosslink density through the formation of urethane and urea linkages. At a particular conversion fraction, the majority of reacted components behave as a structure of seemingly infinite molecular weight. Tack-free time is defined as the time at which the foam surface is no longer sticky to the touch. A/B ratio is simply the ratio of the weight of the contents sprayed out from the A-side divided by that of the B-side. The target A/B ratio is 1.10 for this product.

The cured foam sample was cut approximately 18-24 hours after initial spray-out. Density measurements were made in accordance with ASTM D1622 and involved a simple weight to volume ratio calculation. R-value is a measure of foam insulation potential and was recorded via 8×8×1 $in^3$ foam samples utilizing a LaserComp Fox 250 (TA Instruments, New Castle, DE) in accordance with ASTM C518. While not important to adhesive properties of the foam, it was utilized as a means to measure cell structure degradation over time. Compression stress was measured as an average of six 2×2×1 $in^3$ samples in accordance with ASTM D1621. Compressive stress was taken at 10% deformation from the original height of the foam specimen and were parallel to the rise of the foam. Compression tests were performed on a Zwick Z010 (Zwick GmbH & Co, Ulm, Germany). Foam dimensional stability was measured in accordance with ASTM D2126. Four 4×4×1 $in^3$ foam samples were subjected to 23° C. and 50% relative humidity, 70° C. and ambient relative humidity, 70° C. and 100% relative humidity, and −20° C. and ambient relative humidity for 3, 7, and 30 days each. Changes in volume were measured as a percentage growth or shrink to the initial volume of the foam sample.

In order to test for differences in physical properties across a shelf life of 12 months, the Arrhenius equation was utilized. Kits stored for a period of 12 days at 50° C. will simulate 3 months room temperature shelf life. Kits were sprayed out after different accelerated aging intervals and underwent the physical property testing listed above in the preceding paragraphs. In addition, the catalytic decay rate (CDR), or the ratio of accelerated aging gel time to that of initial gel time, was also recorded in order to determine gel time shift over the age of the kit.

Uniaxial pull tests were performed with a standard pull testing jig in accordance with the ANSI/SPRI IA-1 2010 "Standard Field Test Procedure for Determining the Mechanical Uplift Resistance of Insulation Adhesives over Various Substrates." Two 24-inch×24-inch. CDX-grade plywood plates at 23⁄32-inch thickness were conditioned at 23° C. for a period of 24 hours prior to the start of the test. Then, two 2-inch-width beads sprayed at 12-inch off-center were dispensed along the length of the board. A/B ratios and chemical weights on the boards were recorded. Boards were set into place at a lay-in time, which was defined to be the halfway point between gel and tack-free times, e.g., (gel time+tack-free time)/2. Four 10 lb. weights were used to prevent improper seating of the two plywood substrates and were applied for 20 minutes. Test specimens were allowed at least 24 hours' cure time before being subjected to loading. The loading procedure involved a starting force of 120 lbf. A period of 60 seconds followed before increasing the load by intervals of 60 lbf. Adhesive Failure was defined as the final loading before board-to-board separation of the test "sandwich." This number was then subtracted from the steel plate of the top of the testing jig (17.5 lbs) and divided by 4 to produce the Resistance value. Mode of failure (adhesive, cohesive) average bead width, and amount of chemical were all recorded.

In order to quantitatively analyze the chemical makeup of the B-side blend over product shelf life, Fourier Transform Infrared Spectroscopy (FTIR) was performed on aged blends pressurized with appropriate amounts of HFO-1234ze propellant. A small amount (~15g) of material was ejected from the pressurized cans and allowed to off gas for a period of 6 hours. FTIR scans were conducted at 16 iterations using a Nicolet iS5 with iD7 Attenuated Total Reflectance (ATR) attachment (Thermo Scientific, Waltham, MA) operating with Omnic v. 9.7.46 software. Scans were normalized about the $CH_2$ stretch region (2800-3000 $cm^{-1}$) in order to succinctly draw comparisons.

Results and Discussion

Without being held to any one mode of operation or mechanistic theory, it is believed that upon degradation of the hydrofluoroolefin (HFO) molecule the generated fluoride ion or HF molecule will attack catalysts, surfactants, and especially any monomers with amines or hydroxyl groups present. If, for instance, the HF species comes into contact with a free hydroxyl group, the reaction will produce water and a $-CH_2F$ chain terminus group that will no longer readily react with an isocyanate species. Due to the electron density of this new end group, another fluoride ion is unlikely to interact with this structure and will therefore attack another nucleophilic group. Since amines are better nucleophiles than hydroxyls, amine catalysts are most susceptible to degradation, especially those with higher basicity, followed by hydroxyls under the same pretenses. One can readily imagine that tortuous behavior of these molecules scavenging essential end groups will lead to reduced catalysis, undesirable cell structure, and even incomplete chain networks formation. This presents a challenge to the low-pressure SPF industry: one must be cognizant of the inherent instability of these systems. The goal therefore becomes reducing physical property drift over the course of its shelf life under reasonable conditions instead of attempting to remove them outright.

Prior art identifies that the use of gaseous olefinic propellants in low pressure SPF foam highlights the benefits of polyester polyols, and more specifically aromatic polyester polyols, over that of the especially aliphatic (and typically lower viscosity) polyether polyols. One might expect the polyester polyols to be problematic due to the polyester polyols being better nucleophiles and, therefore, at greater risk of nucleophilic attack. However, it is theorized that polyester polyols, with their longer, stiffer backbones do not reptate as much as the polyether polyols, thereby limiting the probability of fluoride attack. Aromatic groups on the polyester polyols could also induce a pi-pi shielding effect, therefore reducing (but not preventing) fluoride interaction.

A shelf life stability study was performed under accelerated aging conditions for a polyester polyol based polyurethane foam control; and a polyether polyol based polyurethane foam comparative. The polyester polyol control formula included mostly polyester polyols, while the polyether formula contained mainly aliphatic ether polyols. Catalysts, surfactants, plasticizers, and relative concentrations thereof were kept constant. B-side OH-values were kept constant.

Hydroxyl numbers were kept constant for both formulations to remove any isocyanate index concerns. Catalysts, surfactants, plasticizers, and relative concentrations thereof were also kept constant. Water was not added to either formula. The polyester-containing formula, observed a minimal drift in physical properties through 6 months accelerated aging. On the other hand, the polyether-containing formula, failed over the same 6 month accelerated aging process.

The qualitative and quantitative differences are also striking, specifically noting the change in physical properties over time with respect to each formula. The control samples synthesized with mainly polyester polyols maintain a similar R-value (6.38 vs. 6.45), closed cell content (~96%), and compression strength loading (42.8 psi vs. 44.4 psi), demonstrating excellent formula stability. In addition, density values are similar (3.43 lbs/ft3 vs. 3.66 lbs/ft3) and gelation (32 vs. 27 seconds) and tack-free times (37 vs. 42 seconds)

are similar. As used in this application, catalytic decay rate (CDR), is defined as the ratio of accelerated aging gel time to that of initial gel time. This value was recorded in order to determine gel time shift over the age of the kit. A low CDR would indicate greater catalytic stability over that of a high CDR. For the control sample, the CDR goes below 1 (CDR=0.84), which is atypical, but under prior testing the CDR value tended to average at 1.18 through 6 months in pairs of aluminum cans. Conversely, the formula loaded with polyether polyols instead of polyester polyols, exhibited similar initial properties comparable to the polyester polyol but did not survive the accelerated aging process through 6 months. Note the increase in density, poor cell structure, higher gelation time (45 seconds vs. 68 seconds, CDR=1.51), and higher tack-free times (75 seconds vs. 168 seconds). Density, R-value, and closed cell content could not be determined due to lack of foam rise and foam consistency.

It is therefore seen in this system that large amounts of polyether polyols appear to be detrimental to overall system stability, likely due to the interaction of the HF molecule and the polyether polyol. To witness this interaction, a separate B-side aluminum can filled with the same amounts (±1 g) of the gaseous HFO molecule was removed from accelerated aging conditions every 3 months and a small portion of the contents was ejected and then off gassed for FTIR analysis. Through 12 months, the polyether-containing blend underwent noticeable changes as the samples increased in age. Namely, the —OH peak centered about 3440 $cm^{-1}$ increased in intensity as the chemical blend aged. Furthermore, a peak at approximately 1650 $cm^{-1}$ formed over time as well. Both peaks as a whole, increased steadily over time. This increase in —OH intensity, coupled with the formation of the 1650 $cm^{-1}$ peak correlate to $H_2O$ generation in the product, a by-product of the hypothesized HF and —OH reaction. Proving the formation of the —$CH_2F$ end group is somewhat more difficult because the strong C—F stretch peak overlaps the C—O—C stretch peak and other carbon-carbon interactions commonly found in ethers. This peak is centered about 1100 $cm^{-1}$ and increases in intensity steadily over sample age. Thus, it is inferred that the change in this peak, correlates to generation of the C—F species, all things considered. Changes in amine peaks suggest degradation of the amine catalyst, too.

An HFO-blown formula should preferably meet or exceed the adhesive properties of similar, current HFC-blown adhesive products and must be shelf life stable up to 12 months or more. However, that presents a problem. Good adhesives tend to have a mix of both polyester and polyether polyols because their adhesion mechanisms are different but beneficial in their own right. Polyether polyols tend to offer greater flexibility, hydrolytic stability, and are low in viscosity while polyester polyols offer greater cohesive strength yet are higher in viscosity. It is therefore desirable to determine a means of introducing polyether polyol or polyols into an adhesive formula in addition to polyester polyols. Yet as it was shown earlier in this application that polyether polyols are more difficult to formulate into a stable HFO-blown formula.

Through various approaches taken by the applicant and/or inventors, an HFO-blown product with significant polyether polyol and polyester polyol loading on the B-side blend was developed. The HFO molecule selected was HFO-1234ze, commercially-known as Solstince® Gas Blowing Agent (GBA), producted by Honeywell. To do this, a formulation technique was developed so that the polyether poylols would be stable enough over the shelf life of this particular adhesive, henceforth referred to as HFO LPSPF Adhesive.

The formulated HFO LPSPF adhesive product of the present invention was able to reach a 12-month accelerated aged shelf life stability first in pairs of 12-oz aluminum cans. Physical comparisons of core foam samples of taken at initial, 3, 8, and 12 months accelerated aging were taken. Qualitatively, the core foam samples appear almost indistinguisable to one another, as the product undergoes minimal change in cell structure appearance or color body shift (a B-side color body shift toward a yellower color could be a qualitative sign of formula degredation). The formula is stable with respect to gelation and tack-free times, as tack-free drift advances 1:10 minutes and gelation drift advances 0:49 minutes, resulting in a catalytic decay rate (CDR) of 1.30-well within the prescribed stability range of less than 2. Furthermore, the desired A/B ratio of 1.00 remains tight and in-specification (±0.1 or less variation) throughout the shelf life study. The density of the product does increase with respect to age (3.60 $lbs/ft^3$ at initial conditions versus 4.09 $lbs/ft^3$ at 12 months accleratated aging) but should not work to the detriment of the formula. Kit temperatures were kept constant in order to rule out any possible density shift due to errant heating. Intuitively, a higher density merited higher compressive stress at 10% strain loading (52.8 psi vs. 61.6 psi). Furthermore, blend monitoring with the FTIR did not show appreciable blend degradation in comparison with previous studies.

Once this formulation demonstrated high reaction profile and physical property stability, it was scaled-up to pilot production and two different kit sizes utilizing 7.5-inch and 12-inch cylinders were considered. One of the more difficult qualities to measure in pairs of aluminum cans is the spray-out pattern itself. The HFO LPSPF Adhesive product allows for spray-out in bead formation as well as semi-uniform droplets, referred to as a “spatter pattern.” This spatter pattern was confirmed via several independent spray outs. In addition, the bead pattern is particularly noteworthy due to its wettability with the substrate. The fact that this product wets the surface of tested substrates (wood, corrugated cardboard, IsoBoard, and fleeceback membranes) is an attractive quality in that it spreads out as it cures, allowing for greater surface area coverage.

That in mind, a foam that does not undergo significant changes with respect to aging and A/B ratio is most desirable. Temperature will likely influence density and in turn mechanical properties, but should not hinder the ability for the kit to adequately empty. In order to investigate the robustness of this foam system, an accelerated aging study, kit temperature study, and A/B ratio study were all conducted. Consider the select physical properties of the HFO LPSPF Adhesive spray-outs from cylinder kits tabulated in Table 1. This data includes spray-outs conducted at various temperatures as well as kit ages.

The first few data points collected in Table 1 were conducted at similar kit age and similar kit temperature but with A/B ratio varied. For most sampled A/B ratios, the density holds at about 2.60 $lbs/ft^3$. To obtain the extreme A/B ratios, the kit was choked on the A or B-side as it was difficult and undesirable to spray A/B ratios that far from the target A/B ratio of 1.00. While the previously-reported High Density HFO product displayed little variance for core density across the A/B ratio spectrum, the HFO LPSPF Adhesive product decreases in density once it reaches higher A/B ratios, from 2.70 $lbs/ft^3$ at an extremely low A/B ratio of 0.69 to 2.20 $lbs/ft^3$ at an extremely high A/B ratio of 1.31. A linear $R^2$ dependence of 0.71 demonstrates moderate correlation between increasing A/B ratio and decreasing density. This was unexpected, but is plausible given the fact that reduced catalytic behavior will allow for greater foam expansion and, consequently, lower density. These values therefore tend to counterbalance the compressive stress at 10% loading: lower A/B ratios merit softer foam due to being B-rich (A/B ratio>1.00) and therefore having a greater population of soft segments, while higher A/B ratios are less dense but are harder due to greater numbers of aromatic-containing isocyanates present. All things considered, the density undergoes little variance when the A/B ratio is kept near the target A/B ratio of 1.00. Gel and tack-free times increased slightly as A/B ratios increased, but due to discrepancies one may have in measuring gel and tack-free time, this variation is negligible. R-value, while not important for adhesives, was included in this analysis in order to quantify cell structure as a whole. Closed cell content measurements usually suffice for these foam products, but closed cell content was found to have high variance, even when sampled next to one another in the foam sample. As can be seen from the data obtained, R-value tends to vary between 3.5 to 4.5 across the A/B ratio spectrum and worsens the farther one moves from the target A/B ratio of 1.00, especially at the extremes. Consequently, the A/B ratio increase coupled with the density decrease produces a parabolic relationship with compression stress at 10% loading as well, but this is skewed toward B-rich foam. All things considered, this system will gel between 3-4 minutes and will become tack-free at 8-10 minutes under most circumstances for room temperature kits and substrates (23° C.).

aging. Good percent empties (greater than 90% of fill weight for both kit dispensed before one side emptied) were obtained for this product, and A/B ratios taken at intervals throughout the kit spray-out indicate strong ratio stability.

Kit age and A/B ratios should impact foam properties as little as possible, but of course that only accounts for standard operating temperature spray-outs. It is imperative to know how the kit will behave at temperatures outside of these prescribed ranges. Therefore, two kits were conditioned at 5° C. and 50° C. for a period of 1 week in a controllable refrigerator and an oven, respectively. The kit sprayed out at 5° C. had a gel time that mimicked the spray-out at 6 months (267 seconds vs. 260 seconds) but had a longer tack-free time (597 seconds vs. 480 seconds—a difference of roughly two minutes). This longer cure time resulted in a lower density (2.38 lbs/$ft^3$) than at room temperature for most sampled A/B ratios. Despite this, the kit was able to maintain both a bead and spatter pattern spray-out. The kit also had percent empties greater than 90% on both the A- and B-side cylinders and stayed between ±0.2 of the target 1.00 A/B ratio for over 80% of the kit, resulting in a total through-kit A/B ratio of 0.96. On the other hand, the 50° C. spray out also produced a bead and spatter spray patterns as well as the majority of the kit operating between ±0.2 of the target 1.00 A/B ratio for over 80% of the kit. Note the change in gel and tack-free free times, which increased by just over one minute at similar A/B ratios for gel (142 seconds vs. 225 seconds) but was shortened by roughly 4.5 minutes at similar A/B ratios for tack-free (302 seconds vs. 570 seconds). Despite the robustness of the spray-out and

TABLE I

Select physical properties of HFO LPSPF Adhesive cured foam samples prepared in cylinder kits.

| | Kit Temp (° C.) | Kit Age (mon.) | A/B Ratio | Gel (sec) | Tack-Free (sec) | Density (lb/$ft^3$) | R-Value | Compression Stress (psi) |
|---|---|---|---|---|---|---|---|---|
| A/B Ratio Study | 23 | 0 | 0.69 | 195 | 474 | 2.70 ± 0.12 | 3.40 | 11.1 |
| A/B Ratio Study | 23 | 0 | 0.84 | 210 | 460 | 2.57 ± 0.03 | 3.84 | 22.1 ± 0.9 |
| A/B Ratio Study | 23 | 0 | 0.93 | 225 | 570 | 2.61 ± 0.06 | 4.38 | 25.3 ± 0.4 |
| A/B Ratio Study | 23 | 0 | 1.07 | 195 | 435 | 2.65 ± 0.02 | 3.69 | 29.3 ± 0.6 |
| A/B Ratio Study | 23 | 0 | 1.13 | 225 | 570 | 2.35 ± 0.04 | 3.34 | 21.1 |
| A/B Ratio Study | 23 | 0 | 1.31 | 225 | 570 | 2.20 ± 0.05 | 3.13 | 19.3 |
| Aging Study | 23 | 6 | 1.03 | 260 | 480 | 3.00 ± 0.06 | 4.43 | 29.2 ± 3.8 |
| Aging Study | 23 | 12 | | | | | | |
| Temp. Study | 28 | 0 | 1.04 | 190 | 460 | 3.17 ± 0.02 | 4.49 | 39.0 ± 0.5 |
| Temp. Study | 5 | 1 | 0.99 | 267 | 597 | 2.38 ± 0.01 | 5.22 | 19.5 ± 2.2 |
| Temp. Study | 50 | 1 | 1.25 | 142 | 302 | 5.37 ± 0.10 | 3.81 | 106.2 ± 9.1 |

A kit accelerated aging study was conducted at 6 and 12 months accelerated age. As the kit ages from 0 to 6 and finally 12 months, the density and, consequently, the compressive properties, increase as well. However, the R-value is relatively constant, meaning for the spray-outs sampled cell structure appears to be fairly consistent in the product. Also interesting is the higher gel and tack-free times, but these times still reflect a fairly consistent and stable formulation, with a CDR value of 1.22 at 6 months accelerated the overall A/B ratio stability of the product, it is important to note the significance temperature imparts upon the core density of the product at higher temperatures. Due to the reduced cure time, the foam has less time to expand and therefore cannot maintain lower density values at room temperature spray-outs. This rather high density at 5.37 lbs/$ft^3$ resulted in a compressive stress at 10% loading of 106 psi. It is therefore anticipated that this product, like many HFC-blown two-component foaming adhesives currently available, will experience an enhancement in mechanical properties at the cost of reduced yield. Therefore, it underscores the importance of keeping kits within the prescribed temperature ranges.

The foam samples at all A/B ratio ranges, kit ages, and temperature spray-outs were dimensionally stable, falling between ±1% volume change after 30 days of subjecting the foam specimens to the respective environments of room temperature, −20° C., 70° C., and 70° C. with 100% relative humidity. The importance of this cannot be overlooked, as an adhesive which shrinks or expands over time in multiple environments will reduce the look and performance of the foam and is therefore undesirable. This product appears to be dimensionally stable.

While a stable foam is required, and product robustness is essential, one cannot officially determine the adhesive capabilities of this HFO LPSPF Adhesive product until an actual adhesive test is performed side-by-side against a current HFC-blown two-component adhesive product. Therefore, a standard uplift test was performed on an HFC-blown two-component adhesive product as well as the HFO LPSPF product. Stated earlier, a gel and tack-free time was conducted and the halfway point of these two times was when the boards were laid in place. Weights held the boards down for approximately 20 minutes. The adhered boards were allowed to cure for 44 hours before being subjected to a pull.

able. If this problem persists, modifying the formula such as changing the amount of surfactant(s) used, could provide a solution to that issue.

As a result of the above experimentation, a stable two-component low-pressure spray polyurethane foam (SPF) adhesive product has been achieved. This product, called HFO LPSPF Adhesive, is a product with significant polyether and polyester loading on the B-side that has demonstrated stability over a 12-month accelerated aging study. Excellent wetting characteristics as well as system robustness and tensile properties are highlights of this product. In addition, a bead and spatter spray pattern are obtainable with this product.

Pairs of 12-oz aluminum cans were aged at 50° C. for 12 days to simulate three months of accelerated aging. As the product aged, the density increased (3.60 lbs/ft$^3$ initial vs. 4.09 lbs/ft$^3$ at 12 months), which resulted in enhanced compression strength at 10% loading (52.7 psi vs. 61.6 psi). Despite this, gel and tack-free times remained fairly consistent, undergoing a 49 second increase in gel and a roughly 1.5 minute increase in tack-free time across twelve months. This resulted in a maximum catalytic decay rate (CDR) value of 1.30.

A pilot production of this HFO LPSPF Adhesive product at two steel cylinder kit sizes of 7.5-inch and 12-inch allowed for spray pattern testing, and both a bead and a spatter spray pattern were obtained. Three studies on A/B ratio, kit age, and kit temperature was conducted to determine the robustness of the formula. A/B ratios were selected at both in-specification and out-of-specification ranges in order to sample a wide spectrum. Density values remained fairly consistent at about 2.60 lbs/ft$^3$ except at higher A/B ratios, where density reached a minimum of 2.20 lbs/ft$^3$ at an A/B ratio of 1.31. In total, density decreased slightly across the sampled A/B ratio spread. This decrease in density at higher A/B ratios resulted in a second-order parabolic relationship between A/B ratio and compressive stress, which was more significant at B-rich (A/B ratio>1.00) foam. Gel (195 seconds at an A/B ratio of 0.69 vs. 225 seconds at an A/B ratio of 1.31) and tack-free times (474 seconds at an A/B ratio of 0.69 vs. 570 seconds at an A/B ratio of 1.31) increased slightly as A/B ratios increased. All things considered, this product will gel at 3-4 minutes and will be tack-free between 8-10 minutes at room temperature under most circumstances at initial conditions. R-values were measured to monitor cell structures, and a weak parabolic relationship was also determined. R-value varied between 3.50 and 4.50 for most A/B ratios.

A kit aging study showed an increase in gel and tack-free times for this product. Such a phenomenon is to be expected for HFO-blown low pressure spray polyurethane foam sys-

TABLE II

Pull test data from an HFC-blown two-component adhesive against the HFO LPSPF Adhesive product.

| Prod. | Kit Age (mo.) | A/B Ratio | Total Board Wt. (g) | Chemical Wt. (g) | Avg. Bead Width (in.) | Adhesive Failure (lbf) | Resistance (lbf) | Failure Mode |
|---|---|---|---|---|---|---|---|---|
| HFC Adh. | 2 | 1.06 | 7773 | 107 | 2 | 720 | 176 | Cohesive |
| HFC Adh. | 2 | 1.06 | 7550 | 76 | 2 | 730 | 178 | Cohesive |
| HFO 2k Adh. | 2 | 0.95 | 7774 | 124 | 2 | 1640* | 406 | Screws popped |
| HFO 2k Adh. | 2 | 0.95 | 7996 | 104 | 2 | 2200* | 546 | Load Cell Maxed |

*indicates non-adhesive failure, or test stoppage.

Table II organizes the pull test data. A total of two trials were conducted for each product. Kit age was kept constant, and A/B ratios were kept within ±0.1 of the target A/B ratio of the product. Amount of product sprayed onto the boards was also kept relatively consistent. The HFC-blown adhesive product demonstrated consistent adhesive failure which correlated to similar Resistance values of 176 lbf and 178 lbf. Both samples failed via cohesive failure; that is, the foam itself failed and not the adherence to the substrates. On the other hand, the HFO LPSPF Adhesive pull test was inconclusive. On both cases, the adhesive did not fail. Instead, an external event prevented proper measurement of the adhesive strength. In the first trial, anchoring screws holding the plywood to the base popped. In the second trial, the attached load cell would not permit a pull past 2200 lbf. This resulted in greater variance (and likely lower) Resistance (between 406 lbf and 546 lbf), but nevertheless conclusively demonstrates the strong adhesive capabilities of this product. It should be noted that the superior wetting abilities of the HFO LPSPF Adhesive product resulted in larger bead sizes, which likely improved adhesion. One possible drawback to this formula, however, is the gap size utilized during testing (⅜-inch max.). While a larger gap size will likely reduce adhesion strength of the product, gaps are a result of foam expansion during cure and are undesirtems since the HFO molecule will readily degrade and, in turn, degrade the physical properties and reaction profile of any particular two-component product.

A temperature study conducted at kit-conditioned temperatures of 5° C. and 50° C. showed the usual increases in gel and tack-free times as well as density and, consequently, mechanical compression strength, but of note is the excellent on-ratio spray-outs of the product at extreme temperatures, as both scenarios merited greater than 90% empties with over 80% of the tabulated spray-out within +0.2 A/B ratio of the target A/B ratio of 1.00.

Pull tests were performed against an HFC-blown two-component adhesive product in order to draw comparisons with what is already available on the market. Care was given to ensure proper spray out of both products. The A/B ratios were kept within ±0.1 of their target A/B ratios and similar amounts of chemical were sprayed out onto 24-inch×24-inch at 23/32-inch thick CDX-grade plywood substrates. The HFC-blown system obtained a maximum uniaxial force of 720 lbf and 730 lbf, correlating to Resistance values of 176 lbf and 178 lbf and failed cohesively. On the other hand, the HFO LPSPF Adhesive system had values of 1640 lbf and 2200 lbf, which correlated to Resistance values of 406 and 546. However, this product did not fail under both tests. Instead, the first test was stopped when the anchoring screws securing the plywood sandwich to the base failed, and the second test was stopped when the load cell maxed out. Therefore, the actual Resistance of this product is unknown, but is understood to be high. A potential issue of some foam expansion while curing resulted in small (3/8-inch max.) gaps between the two plywood substrates. Such an issue may be remedied with small formula adjustments.

As previously illustrated in this application, HFC-blown polyurethane foams and HFO-blown polyurethane foams are not drop-in replacements.

All considered, it is understood that polyether polyols have better adhesive properties than polyester polyols. This is believed to be due to the lower polarity of polyether polyols, which reduces surface tension and therefore increases wetting with the substrate. On the other hand, polyester polyols allow for increased tensile properties and higher modulus. It is therefore beneficial to determine a means of introducing polyether polyol or polyols into an adhesive formula along with polyester polyols. A formula with a reduced catalyst package was utilized in order to meet the reactivity profile of the adhesive polyurethane product. By reducing the amount of catalyst present in the system, and through general formulation adjustments, a product with 35% polyether polyol loading on the B-side blend was developed. Furthermore without being bound to any one theory or mode-of-operation, it is believed that the use of glycerin as a fluoride ion scavenger may beneficially increase the shelf life stability of this product. Comparisons of HFO formulations are illustrated in Table III. Note that it is now possible to have significant amounts of polyester polyols and polyether polyols in the composition, provided that at least some glycerin (synonymously "glycerol") is also present, a simple triol. It is recognized that the fluoride ion scavenger will preferably have a functionality of ≥2.0, preferably ≥2.2.

TABLE III

| "B-side" | | HFO Generation #1 | HFO Generation #2 |
|---|---|---|---|
| Polyol | polyester polyol with functionality ≥2.2 | >50% | 30-50% |
| | polyether polyol with functionality ≥2.0 | <10% | 10-40% |
| | glycerin | 0% | 1-10% |
| Flame Retardant/Plasticizer | haloalkyl phosphate | 20-45% | 10-35% |
| Catalyst | tertiary amine | 1-5% | 0.3-1% |
| | potassium-based trimerization catalyst | 1-5% | 0.3-1% |
| Surfactants | polyether polydimethylsiloxane copolymer | 1.5-3.0% | 1.5-3.0% |
| | Water (added) | 0-1.5% | ~0% |
| | HFO-1234ze (optionally inert gas for propellant) (to adjust the internal B-side cylinder pressure to between ~100-250 psi) | | |
| "A-side" | diisocyanate | 100% | 100% |
| | HFO-1234ze (optionally inert gas for propellant) (to adjust the internal A-side cylinder pressure to between ~100-250 psi) | | |

While glycerin is one specific example of a triol with scavenging capabilities, the invention is not limited to such. In fact, lower molecular weight polyols, e.g., a triol or specifically a polyol (including diols) having a functionality ≥2, preferably ≥2.2 are believed to be useful in this invention. Molecular weight ranges of the polyol(s) are anticipated to range between ~90 to ~1500 g/mol are believed to be applicable to this invention.

TABLE IV

| "B-side" Polyol-Ether | Description | OH# | A % | B % | C % | D % | E % | F % | G % |
|---|---|---|---|---|---|---|---|---|---|
| 20-112 | Propylene oxide diol, MW = 1000 | 112 | | | 22.0 | 25.0 | 35.0 | 44.9 | 76.1 |
| 30-168 | Oxypropylated triol, MW = 1000 | 168 | | | | 47.0 | | | |
| 30-280 | Oxypropylated triol, MW = 1615 | 274 | | | | | | 44.0 | |
| Polyol-Ester | | | | | | | | | |
| TB-350 | Branched polyester polyol, f = 2.2, MW = 350 | 350 | 27.2 | 44.6 | 43.5 | | 39.0 | | 10.0 |
| "B-side" | | | A | B | C | D | E | F | G |
| | 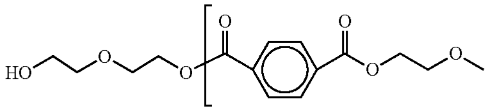 | | | | | | | | |
| PS-1752 | Aromatic polyester polyol, f = 2, MW = 640 | 175 | 40.4 | | | | | | |
| PS-2352 | Aromatic polyester polyol, f = 2, MW = 470 | 240 | | 18.0 | | | | | |
| | 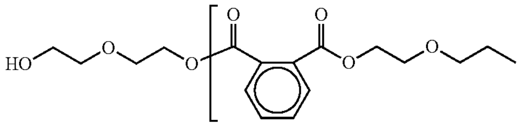 | | | | | | | | |
| Plasticizer | | | | | | | | | |
| TCPP | Flame retardant / plasticizer | 0 | 30.0 | 33.8 | 30.0 | 10.0 | 20.6 | | |
| Hexadecene | plasticizer | 0 | | | | | | 5.0 | 5.0 |
| Surfactant | | | | | | | | | |
| B8870 | Low modification hyperbranched surfactant | 60 | 1.0 | 1.5 | 2.4 | 2.2 | | | |
| Dabco DC-198 | Silicone glycol copolymer | 0 | | | | | 1.4 | 1.4 | 1.4 |
| Silstab 1635 | DMS and polyoxyalkylene block copolymer | 45 | | | | | 2.0 | 3.0 | 3.0 |
| Catalyst | | | | | | | | | |
| Polycat 12 | Blowing catalyst (polyurea reaction) namely, N-Methyldicyclohexylamine | 0 | 0.7 | 0.9 | 0.5 | 0.4 | 0.4 | 0.35 | 0.35 |
| Dabco TMR-20 | Potassium trimerization catalyst | 850 | 0.7 | 0.9 | 0.5 | 0.4 | | | |
| Dabco T-120 | Aggressive tin catalyst | 0 | | | | | 0.5 | 0.2 | 0.2 |
| Glycerin | F-ion scavenger | 1828 | | | 1.1 | | 1.1 | 1.2 | 3.95 |
| Water | Density modifier | 6233 | | 0.3 | | | | | |
| 1,4-butanediol | Chain extender | 1247 | | | | 15.0 | | | |
| | totals | | 100 | 100 | 100 | 100 | 100 | 100 | 100 |
| | MAX CDR | | 1.58 | 1.53 | 1.30 | 1.30 | 1.29 | 0.87 | 0.70 |
| | MAX CDR (Tack-Free) | | 1.78 | 2.05 | 1.21 | 1.17 | 1.30 | 1.46 | 0.62 |

For composition "A", which is a no glycerin, pure polyester polyol formulation, the total polyol amount =67.6%; and the total catalyst amount =1.4%. This composition was a borderline fail on CDR (gel), and a fail on CDR (tack-free). The conclusion that may be drawn is that by simply taking an HFO generation I formula (High Density) and reducing catalyst content did not produce an acceptable formula.

For composition "B", which is a no glycerin, pure polyester polyol system, wherein the total polyol amount=62.6%; and the total catalyst amount=1.8%. This composition was a borderline fail on CDR (gel), and a fail on CDR (tack-free). The conclusion that may be drawn is that adding water to system exacerbates Tack-Free CDR, even in small amounts. The foam is still very rigid. A softer foam product is desired for an adhesive product, which is the targeted end-use for this composition.

For composition "C", glycerin was added at 1.1%; the total polyol amount=65.5%. The product was a solid pass for both CDR (gel) and CDR (tack-free). The conclusion that may be drawn is that even as polyether and polyester polyols are added with glycerin added to the low catalyst concentration, the composition shows improved reaction stability over the course of its shelf life.

For composition "D", in which BDO was substituted for glycerin, and added in higher amounts: the total polyol amount=72.0% (pure polyether) and the total catalyst amount=0.8%, the composition appears to be stable for CDR (gel) and CDR (tack-free) up until foam product collapses. The conclusion that may be drawn is that BDO, another small molecule like glycerin, appears to help with reactive stability. The collapsing foam product may be attributable to the fact that BDO is di-functional and fluoride ion scavenging creates chain terminus. Glycerin is tri-functional, which significantly reduces the likelihood of chain terminus forming (two fluoride ions on glycerin molecule is highly unlikely due to probability and polarity).

For composition "E", glycerin was added at 1.1%, the total polyol amount:=74.0% and the total catalyst amount=0.9%. The composition was a solid pass for both CDR (gel) and CDR (tack-free). The conclusion that may be drawn is that wwapping out TMR-20 with T-120 merits a solid pass for the foam product. As seen with composition "C", it is possible to add in polyether polyols to the blend.

For composition "F", glycerin was added at 1.2%, the total polyol amount=88.9% (pure polyether) and the total catalyst amount=0.55%. The composition was again a solid pass for both CDR (gel) and CDR (tack-free). The conclusion that may be drawn is that even as polyether polyols are added, glycerin added to the low catalyst concentration improves reaction stability over the course of its shelf life.

For composition "G", glycerin added at 3.95%, the total polyol amount=86.1% (pure polyether) and the total catalyst amount=0.55%. The composition was again a solid pass for both CDR (gel) and CDR (tack-free). The conclusion that may be drawn is that polyester/polyether systems are stable under this formulation.

For an adhesive system with low catalyst concentration (<2%) and low water concentration (<1%), the ideal product will have a formula that would have a CDR (gel) and CDR (tack-free)<1.50 over the course of its entire shelf life.

Without glycerin, the adhesive formulas do not appear to hit this number from what we have tested. The addition of BDO shows improved reaction stability but foam product changes through shelf life. Glycerin appears to assist with reactivity stability, possibly acting as a low-MW shield or F-ion scavenger.

In the foregoing description, certain terms have been used for brevity, clearness and understanding; but no unnecessary limitations are to be implied therefrom beyond the requirements of the Prior Art, because such terms are used for descriptive purposes and are intended to be broadly construed. Moreover, the description and illustration of the invention is by way of example, and the scope of the invention is not limited to the exact details shown or described.

The best mode for carrying out the invention has been described for purposes of illustrating the best mode known to the applicant at the time. The examples are illustrative only and not meant to limit the invention, as measured by the scope and merit of the claims. The invention has been described with reference to, preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A B-side component of a two component low pressure polyurethane foam, the B-side component consisting of:
- a fluoride ion scavenger;
- one or more polyols consisting of all polyether polyols and fluoride ion scavenger that is a polyol and no polyester polyols;
- at least one surfactant;
- at least one plasticizer;
- at least one catalyst; and
- an HFO propellant consisting of 1,3,3,3-tetrafluoropropene and no other HFO propellant other than 1,3,3,3-tetrafluoropropene,
- wherein water is in an amount of less than 1% by weight of the B-side prior to inclusion of the HFO propellant at the B-side.

2. The B-side component of claim 1, wherein the one or more polyether polyols are approximately 35% or greater by weight of the B-side.

3. The B-side component of claim 1, wherein the one or more polyether polyols comprise at least 35% by weight of the B-side of at least one oxypropylated triol and at least one propylene oxide diol.

4. The B-side component of claim 1, wherein the fluoride ion scavenger comprises glycerin.

5. The B-side component of claim 1, wherein the at least one catalyst comprises:
- an amine catalyst; and
- a catalyst that includes an organotin catalyst.

6. The B-side component of claim 1, wherein a catalytic decay ratio (gel) is <1.5.

7. The B-side component of claim 6, wherein a catalytic decay ratio (tack-free) is <1.5.

8. The B-side component of claim 7, wherein the catalytic decay ratio (gel) is <1.5 through at least six months, and wherein the catalytic decay ratio (tack-free) is <1.5 through at least six months.

9. The B-side component of claim 7, wherein the catalytic decay ratio (gel) is <1.5 through at least twelve months, and wherein the catalytic decay ratio (tack-free) is <1.5 through at least twelve months.

10. The B-side component of claim 1, wherein the water in the amount of less than 1% by weight of the B-side prior to inclusion of the HFO propellant at the B-side is 0% water by weight of the B-side prior to inclusion of the HFO propellant at the B-side.

11. A B-side component of a two component low pressure polyurethane foam, the B-side component consisting of:
- a fluoride ion scavenger;
- one or more polyols consisting of all polyether polyols and fluoride ion scavenger that is a polyol and no polyester polyols, wherein the one or more polyether polyols comprise at least one oxypropylated triol and at least one propylene oxide diol;
- at least one surfactant;
- at least one plasticizer;
- at least one catalyst; and
- an HFO propellant consisting of 1,3,3,3-tetrafluoropropene and no other HFO propellant other than 1,3,3,3-tetrafluoropropene,
- wherein water is in an amount of less than 1% by weight of the B-side prior to inclusion of the HFO propellant at the B-side.

12. The B-side component of claim 11, wherein the one or more polyether polyols are approximately 35% or greater by weight of the B-side.

13. The B-side component of claim 11, wherein the water in the amount of less than 1% by weight of the B-side prior to inclusion of the HFO propellant at the B-side is 0% water by weight of the B-side prior to inclusion of the HFO propellant at the B-side.

14. The B-side component of claim 11, wherein the fluoride ion scavenger comprises glycerin.

* * * * *